United States Patent [19]

Benson

[11] 3,988,837
[45] Nov. 2, 1976

[54] OPTICAL PLUMBING DEVICE
[76] Inventor: George E. Benson, 7013 Brookcrest Way, Citrus Heights, Calif. 95610
[22] Filed: Mar. 21, 1975
[21] Appl. No.: 560,609

[52] U.S. Cl. .................................... 33/227; 33/286
[51] Int. Cl.² ........................................ G01C 15/00
[58] Field of Search .............. 33/227 R, 275, 283, 33/286

[56] References Cited
UNITED STATES PATENTS
3,044,173 7/1962 O'Neal et al. ....................... 33/227
3,505,739 4/1970 Abrams .............................. 33/227

Primary Examiner—Richard E. Aegerter
Assistant Examiner—Willis Little

[57] ABSTRACT

A plumb light device for locating a plumb spot on a ceiling or tracing a line from floor to ceiling, the device has a leveling platform with adjustable support pegs, alignment means and leveling indicators, and has further a light source with a power supply and a focal means for directing a parallel pencil beam of light through an aperture preferably located in a carrying handle.

3 Claims, 2 Drawing Figures

U.S. Patent  Nov. 2, 1976  3,988,837
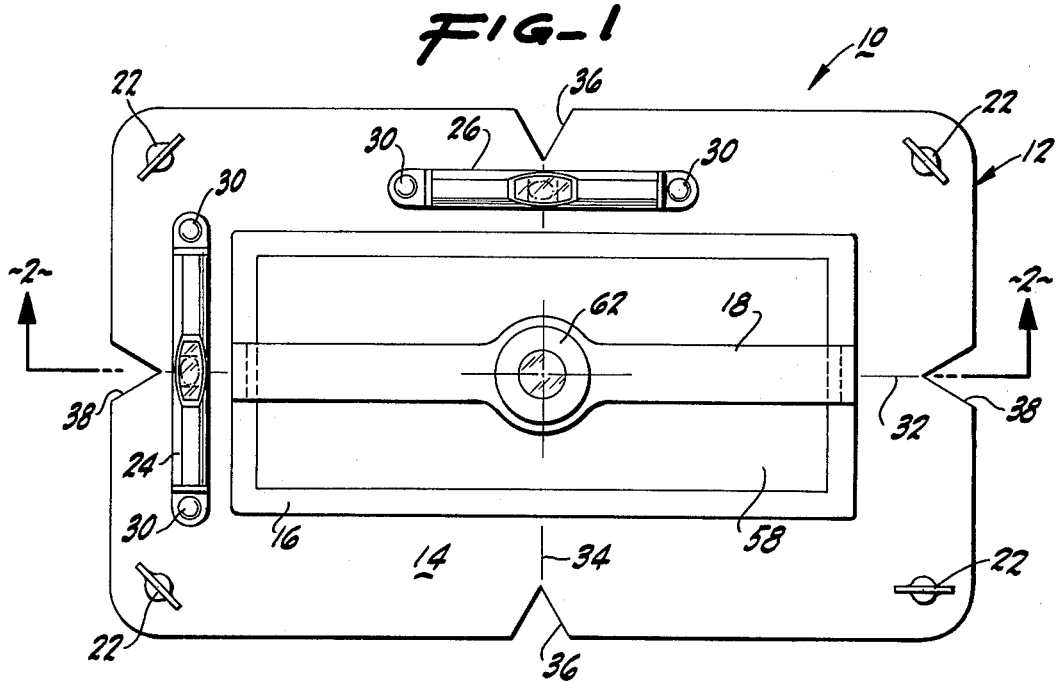
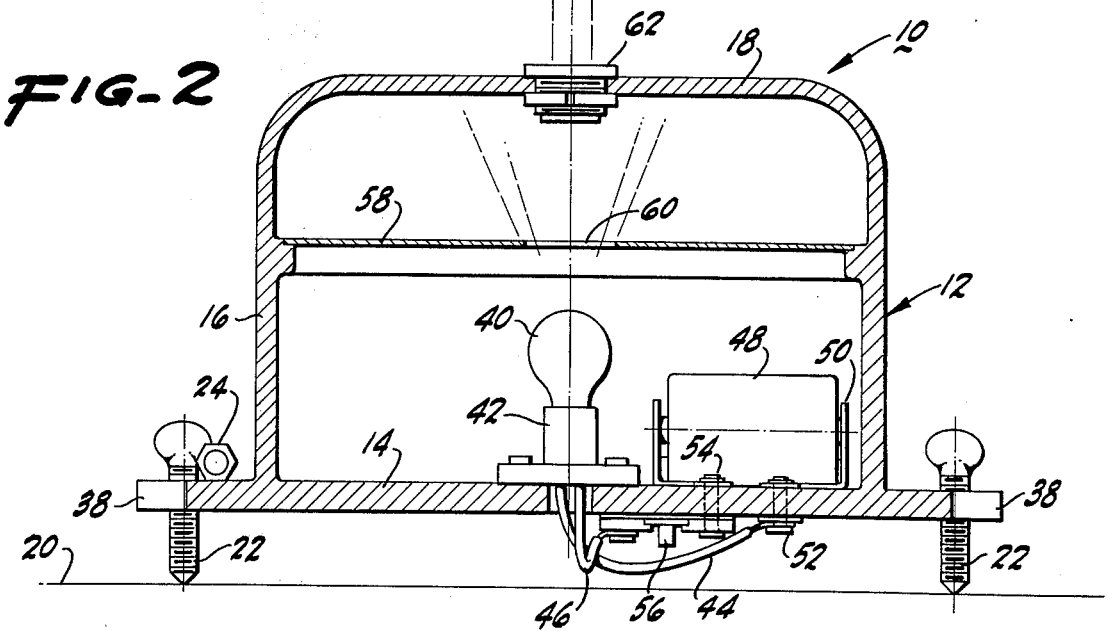

3,988,837

OPTICAL PLUMBING DEVICE

BACKGROUND OF THE INVENTION

This invention relates generally to an optical measuring device for a line of sight projection of an angle measurement from a reference surface. In particular, the device of this invention comprises an optical plumbing device for determining verticality from a point on a reference surface to a point on a surface vertically and spatially displaced from the reference surface.

In the past, the conventional device for determining verticality has been the plumb line. The plumb line includes a line or cord having one end fastened to a weight or plumb bob. To transfer a point on one surface to a point on a second surface, vertically and spatially displaced from the first surface, the line is held or supported such that the plumb bob is freely suspended at the end of the line. If a point is to be transferred from the lower of the two surfaces to the upper, the line is adjusted such that the plumb bob is positioned over the point on the lower surface. The point on the upper surface where the line intersects is the transfer point. Generally, this operation is a two man operation unless the spatial distance between the two surfaces is short. A device that would permit a plumbing operation to be accomplished by a single person is to be desired.

SUMMARY OF THE INVENTION

The optical plumbing device of this invention utilizes a pencil beam of light, from a support platform which has means for leveling the platform on a support surface. The pencil beam is directed vertically upward to spot a point on a surface vertically and spatially displaced from a reference point on the support surface. The point spotted can be marked for further reference.

The optical plumbing device includes a support platform on which is mounted leveling indicators and adjustable leveling means which support the platform over a supporting reference surface such as a floor. By adjusting the leveling means with reference to the leveling indicators, the platform can be trued to a level position on the floor. The platform also includes locating indicia for alignment of the device over a reference point defined by intersecting perpendicular lines. Fixed to a platform is a light source having a self contained power supply, such as conventional dry cell batteries. The light source cooperatively operates with a focal means such as a lens arrangement mounted with respect to the support platform to produce a parallel beam light emission perpendicular to the support platform. The emission is projected to a spatially distant surface. In the preferred embodiment an aperture and lens are included in a carrying handle for convenience and compactness of the device.

The device can also be utilized to transfer a point on a higher surface to a lower surface by locating the projected beam on the point on the higher surface and marking the lower surface at the locating indicia to fix a point on the lower surface. Further, by orienting select marking indicia on the device, with respect to a line on a support surface, a line can be traced by movement of the plumb light device along the line and periodically marking the transfer spot cast by the light source on the surface above the reference surface. These and other features will become apparent from the detailed description of the invention.

BRIEF DESCRIPTION OF THE DRAWINGS

FIG. 1 is a top view of the plumb light device.
FIG. 2 is a cross-sectional view of the plumb light device taken on the lines 2—2 of FIG. 1.

DETAILED DESCRIPTION OF THE PREFERRED EMBODIMENTS

Referring to FIG. 1, the plumb light device, designated generally by the reference numeral 10, is shown. The plumb light device 10, shown also in cross section in FIG. 2, is constructed with an integrally fabricated support structure 12 comprising a flat leveling platform 14, a light enclosure housing 16 and a carrying handle 18.

The leveling platform 14 is supported above a ground surface, such as a floor 20, illustrated in FIG. 2, by four adjustable threaded thumb screws 22, which operate as support pegs for the leveling platform. Orienting the support platform to a level position is accomplished by manipulation of the thumb screws 22 with reference to two spirit levels 24 and 26 mounted to the top surface 28 of the leveling platform by rivets 30. The spirit levels are arranged on the leveling platform such that each level is parallel to one of the two cross axes, 32 and 34 of the leveling platform. Each axis of the cross axes is defined by oppositely positioned pairs of marking notches, 3 and 38, on the preiphery of the support platforms. For example, the spirit level 24 is oriented parallel to the axis 34, defined by the notches 36, and the spirit level 26 is oriented parallel to the axis 32, defined by the notched 38. In this manner, the plumb light device 10 can be centered over a point defined by the intersection of two prependicular line markings on the floor by aligning the pairs of notches with the line markings (not shown). The centered plumb light device can be leveled by adjustment of the leveling platform as described. While the pair of cylindrical spirit levels are preferred for reasons of accuracy, the pair of levels may be replaced by a single "bullseye" spirit level.

The light enclosure housing 16, contains an incandescent light bulb 40 supported in the housing in a socket 42 mounted on the center of the leveling platform 14. The light bulb is electrically connected by electrical leads 44 and 46 to a power source, here a dry cell battery 48 mounted in the light enclosure housing 16. The battery 48 is retained in an electrically conductive bracket 50. One end of the bracket 50 is directly connected to the electrical lead by a rivet terminal 52, which also secures the bracket to the leveling platform. The other end of the bracket 50 is electrically connected through a rivet terminal 54 to a slide switch 56 which in turn, selectively connects to the electrical lead 46 by manual operation of the slide switch 56.

Light emitted from the bulb 40 is constricted by a cover plate 58 over the housing 16. The plate 58 includes an aperture 60 through which light is directed at a focusing lens unit 62 mounted in the carrying handle. The focusing lens unit refracts the light into a pencil beam 64, illustrated by the dotted arrow lines. The pencil beam is directed upward to cast a light spot 66 on a ceiling or the like. By marking the center of the light spot 66, the plumb point on the ceiling corresponding to the point on the floor is located.

While in the foregoing specification, embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A portable optical plumbing device, placeable on an external supporting surface for directing a pencil beam of light to an external surface vertically and spacially displaced from the supporting surface comprising:
   a. a substantially flat support platform;
   b. an enclosure structure defining an enclosure with a top opening cover having a light constricting aperture, said enclosure structure being mounted substantially centrally on said support platform;
   c. at least one spirit level mounted on said support platform outside said enclosure structure;
   d. indicia means on said support platform for locating said support platform relative to a point on the supporting surface;
   e. adjustable support means connected to said support platform outside said enclosure structure, for adjusting the level of said support platform with the external supporting surface;
   f. a self contained power source mounted within said enclosure structure on said support platform;
   g. a light source mounted within said enclosure structure below said light-constricting aperture electrically connected to said power source, said light source emitting dispersed light generally directed out said top opening light constricting aperture in said top cover of said enclosure structure on said support platform;
   h. a combination handle structure and lens mount comprising a flat narrow support member having ends fixedly connected to said enclosure structure and a central portion arched over said top cover, said support member having a lens mounting aperture in said central portion positioned directly over and spatially displaced from said light constricting aperture in said top cover;
   i. a focusing lens mounted in said lens mounting aperture, said lens having focusing properties for focusing dispersed light directed at said lens through said light constricting aperture from said light said light constricting aperature having a perimeter larger than that of said lens source into a pencil beam of light, whereby said pencil beam of light and a substantial portion of said dispersed light are projected from said optical plumbing device to an external surface parallel to said support platform.

2. The optical plumbing device of claim 1 wherein said adjustable support means comprises at least three threaded support pegs threadably engaged with said support platform having support ends depending from said support platform.

3. The optical plumbing device of claim 2 wherein said indicia means comprises cross axis markings on said support structure.

* * * * *